United States Patent [19]

Reedy

[11] 3,841,167

[45] Oct. 15, 1974

[54] HINGED CLEAT FOR SNOWMOBILE DRIVE TRACK

[75] Inventor: Donald G. Reedy, Caro, Mich.

[73] Assignee: Special Sports Products Corporation, Caro, Mich.

[22] Filed: Aug. 17, 1973

[21] Appl. No.: 389,378

[52] U.S. Cl. .............................. 74/231 R, 305/58
[51] Int. Cl. ...................... F16g 1/00, B62d 55/08
[58] Field of Search ............... 74/231 R; 305/58, 39

[56] References Cited
UNITED STATES PATENTS
2,706,663  4/1955  Heckerman, Jr. ................ 305/58 X
3,690,741  9/1972  Pierson ......................... 74/231 R X

*Primary Examiner*—Leonard H. Gerin
*Attorney, Agent, or Firm*—John J. Swartz

[57] ABSTRACT

A ground-engaging cleat for a snowmobile drive track which has an endless belt, comprising aligned cleat sections which are mountable on the belt and swingably connected for relative swinging movement as the vehicle negotiates uneven terrain.

8 Claims, 4 Drawing Figures

PATENTED OCT 15 1974 3,841,167

HINGED CLEAT FOR SNOWMOBILE DRIVE TRACK

BACKGROUND OF THE INVENTION

This invention relates to an endless drive track for a snowmobile, and more particularly to a cleat assembly with articulately connected sections which will relatively swing to conform to the ground as the vehicle negotiates uneven terrain.

Snowmobiles are conventionally driven by an endless ground-engaging drive track trained around front and rear sprocket wheels and a plurality of intermediate idler sprocket wheels. Conventional "grouser type" drive tracks include traction increasing, U-shaped cleats which are spaced along the length of the track and generally hardened to minimize wear. When the vehicle is traversing uneven terrain, the rigid bars do not conform to the contour of the terrain, and thus the maximum traction is impaired. When the snowmobile drive track, traveling at a high rate of speed, negotiates an obstacle with only one half of the track, the U-shaped cleats or bars are subjected to a substantial bending moment which frequently causes the bars to break. Accordingly, it is an object of the present invention to provide articulately connected cleat sections for an endless drive track which will improve the traction capabilities of the drive track and will enable the cleat section to better mate to the surface being traversed.

It is a further object of the present invention to provide an endless drive track for a snowmobile, including a cleat assembly having pivotally connected cleat sections.

It is another object of the present invention to provide a cleat assembly including generally U-shaped cleat bar sections terminating in hinge plates which are pivotally connected for swinging movement.

It is yet another object of the present invention to provide an endless drive track including a cleat assembly having aligned, pivotally connected, cleat sections.

Other objects and advantages of the present invention will become apparent to those of ordinary skill in the art as the description thereof proceeds.

SUMMARY OF THE INVENTION

A cleat assembly for a snowmobile, including a pair of cleat sections connected for swinging movement.

The present invention will more readily be understood by reference to the accompanying drawings, in which.

Figure 1:
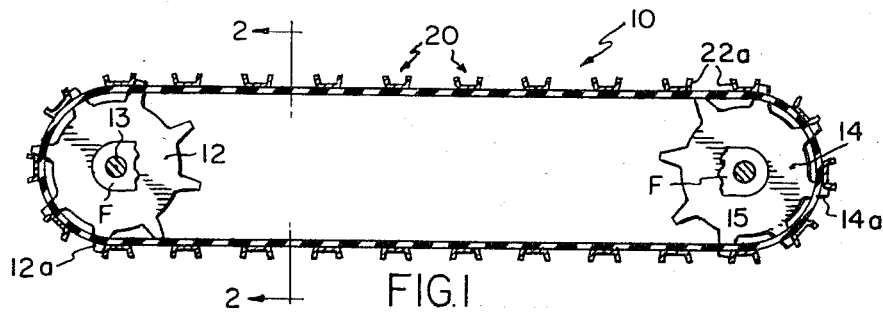
FIG. 1 is a sectional side view of a snowmobile drive track, constructed according to the present invention.

An endless track, generally designated 10, for propelling a snowmobile is trained around a pair of laterally spaced, forward driven sprocket wheels 12 and a pair of transversely spaced rear idler sprocket wheels 14 suitably mounted for rotation on a snowmobile frame F by shafts 13 and 15, respectively. The drive track 10 not only provides the support for the rear end of the snowmobile, but also forwardly propels the snowmobile when the drive sprocket wheels 12 are driven by a gasoline powered engine mounted at the front end of the machine. A pair of steerable skis (not shown) are provided as usual for supporting the front of the snowmobile.

The endless track 10 comprises a central, endless, flexible belt 16 and a pair of laterally spaced endless belts 18 which are generally coextensive with and parallel to the central belt 16. The belts 16 and 18 may comprise either reinforced molded rubber, or reinforced laminated plies of rubber. The outer belts 18 are spaced from the central track 16 by gaps $g$ which receive the sprocket teeth 12a and 14a of the sprocket wheels 12 and 14. The total width W of the track 10 may typically be 15 to 18 inches.

Figure 4:
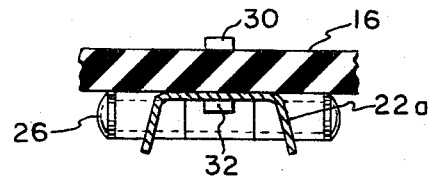
FIG. 4 is an enlarged, sectional end view of a cleat taken along the line 4—4 of FIG. 2.

Mounted along the length of the track 10 are a plurality of cleat assemblies, generally designated 20, each comprising a pair of transversely aligned bars or cleat sections 22, which are generally U-shaped in cross section (FIG. 4), but are flattened at their inner abutting ends to provide hinge plates 24, coupled together for swinging movement by a hinge pin 26. Each U-shaped bar or cleat section 22 includes an elongate, generally planar, base 22b, normally in the same plane as the base 22b of the aligned cleat section, spanning one of the outer drive belts 18 and the central drive belt 16. The bars 22 are fastened to the belts 16 and 18 via bolts 30 which pass through apertures 23 in the bases 22b, and nuts 32 which are used to secure them. The cleat sections 22 include ground-engaging side legs 22a which engage the surface being traversed to improve the traction capabilities of the vehicle. The spacing between the cleat assemblies 20 is equal to the pitch of the sprocket teeth 12a which engage behind each cleat assembly 20 as it negotiates the sprocket 12.

It should be understood, of course, that rather than bolting the cleat assembly to the track, the cleat sections 22 could be molded into the track to eliminate the need for the bolts 30 and nuts 32.

Figure 2:
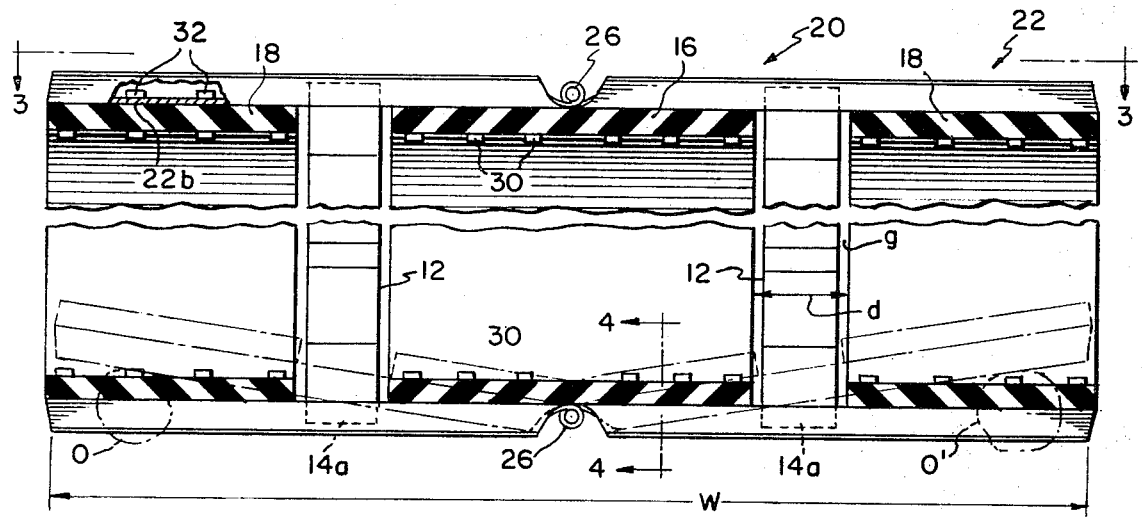
FIG. 2 is an enlarged, sectional end view taken along the line 2—2 of FIG. 1.
Figure 3:
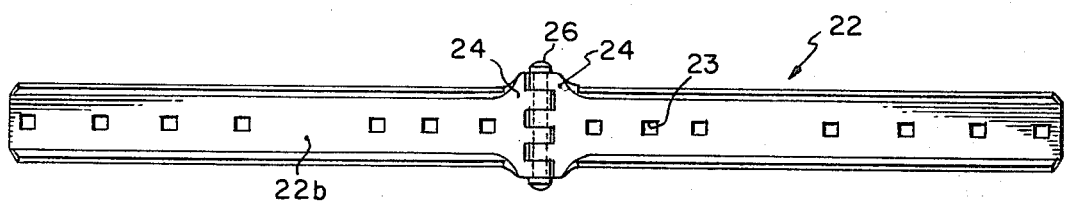
FIG. 3 is a top plan view of a cleat only, taken along the line 3—3 of FIG. 2.

The hinge plates 24 and the hinge pins 26 comprise articulated joints or hinges which permit the aligned cleat sections 22 to swing relative to each other and mate with the ground, even when uneven terrain is being traversed. If the track 10 engages a pair of obstructions 0 and 0', for example, as illustrated in FIG. 2, the cleat sections 22 will swing in opposite directions from the positions illustrated in solid lines in FIG. 2 to the positions illustrated in chain lines in FIG. 2.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. An endless drive track for propelling a snowmobile and the like comprising:
    a central drive belt adapted to travel in an endless path;
    a pair of generally coextensive, laterally outer, drive belts, disposed on laterally opposite sides of, and in parallel relation with, said central drive belt, said laterally outer belts being adapted to travel in endless paths of travel;

a plurality of ground-engaging cleats mounted on and spaced along said drive belts, each of said cleats including a pair of transversely extending, ground-engaging cleat sections spanning said central belt and said laterally outer belts; and means swingably connecting said cleat sections permitting one of said cleat sections to swing relative to the other cleat section so that said cleat sections can mate with the surface being traversed.

2. An endless drive track as set forth in claim 1 wherein said cleat sections are aligned and said connecting means comprises articulated hinge means.

3. An endless drive track as set forth in claim 2 wherein said cleat sections are U-shaped throughout a substantial portion of their length and terminate at their adjacent inner ends in flatted hinge plates joined by a hinge pin constituting said hinge means.

4. An endless drive track as set forth in claim 3 wherein said central belt is wider than said laterally outer belts, said hinge pin being juxtaposed with the central portion of said central belt.

5. The endless drive track as set forth in claim 1 wherein said cleat sections each comprise a U-shaped bar terminating in an integral, flat hinge plate connected via a hinge pin to the hinge plate of the aligned U-shaped bar.

6. An endless drive track for propelling a snowmobile and the like, comprising:

ground-engaging drive belt means adapted to travel in an endless path of travel;

a plurality of ground-engaging cleat means, mounted along the length of said belt means, each including a pair of normally transversely extending cross bars, each cross bar having a ground-engaging portion and an integral hinge section adjacent the hinge section of the other cross bar; and means connecting said adjacent hinge sections for swinging movement.

7. The endless drive track as set forth in claim 1 wherein said ground-engaging portion is U-shaped in cross section and said hinge section is generally planar.

8. A cleat assembly for an endless drive track comprising:

a pair of elongated, ground-engaging bars, terminating at one end in a hinge plate;

means for connecting said bars to said track; and means connecting said hinge plates for swinging movement.

* * * * *